Jan. 24, 1956 P. H. MacMAHON 2,732,541
SIGNALLING DEVICES
Filed Sept. 10, 1952 4 Sheets-Sheet 1

INVENTOR
Paul H. MacMahon

BY *Ogle R. Singleton*

ATTORNEY

Jan. 24, 1956  P. H. MacMAHON  2,732,541
SIGNALLING DEVICES

Filed Sept. 10, 1952  4 Sheets-Sheet 2

INVENTOR
Paul H. MacMahon
BY Ogle R. Singleton
ATTORNEY

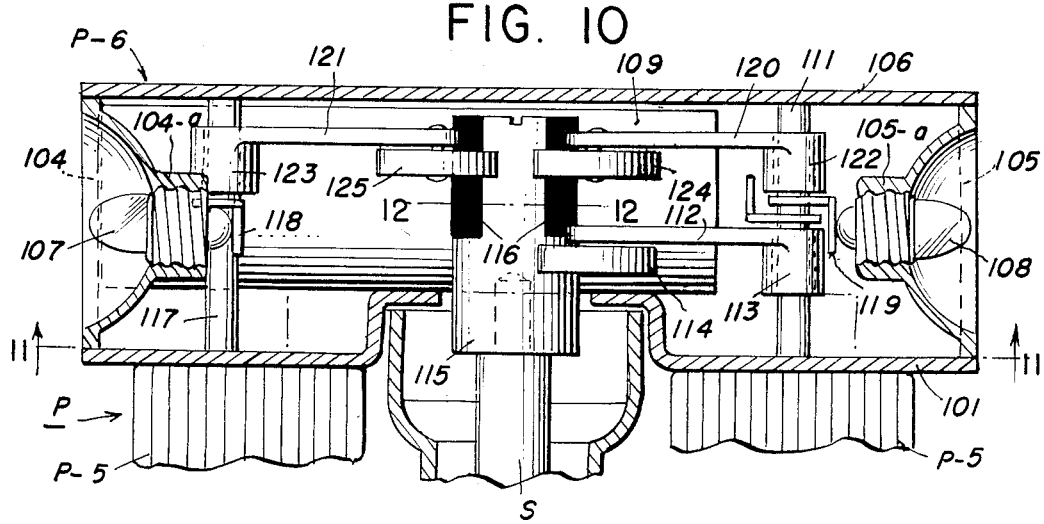
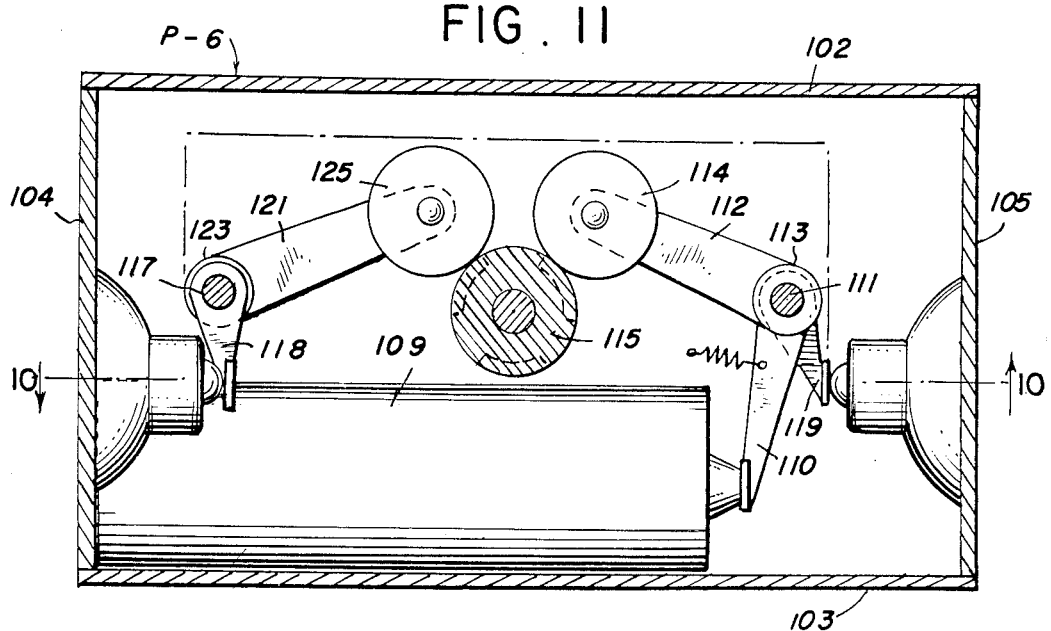
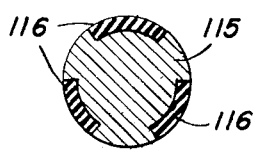

Jan. 24, 1956
P. H. MacMAHON
2,732,541
SIGNALLING DEVICES
Filed Sept. 10, 1952
4 Sheets-Sheet 4
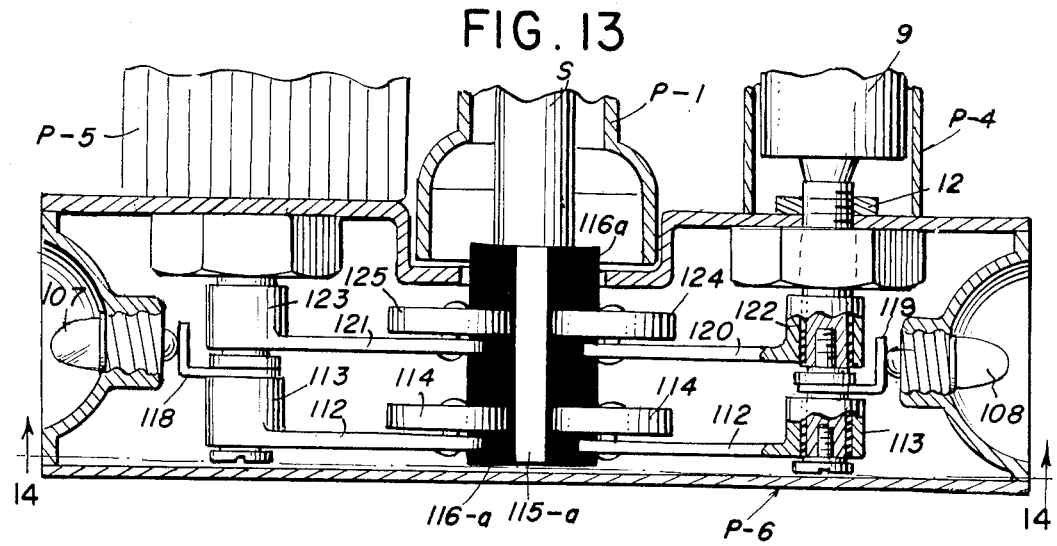
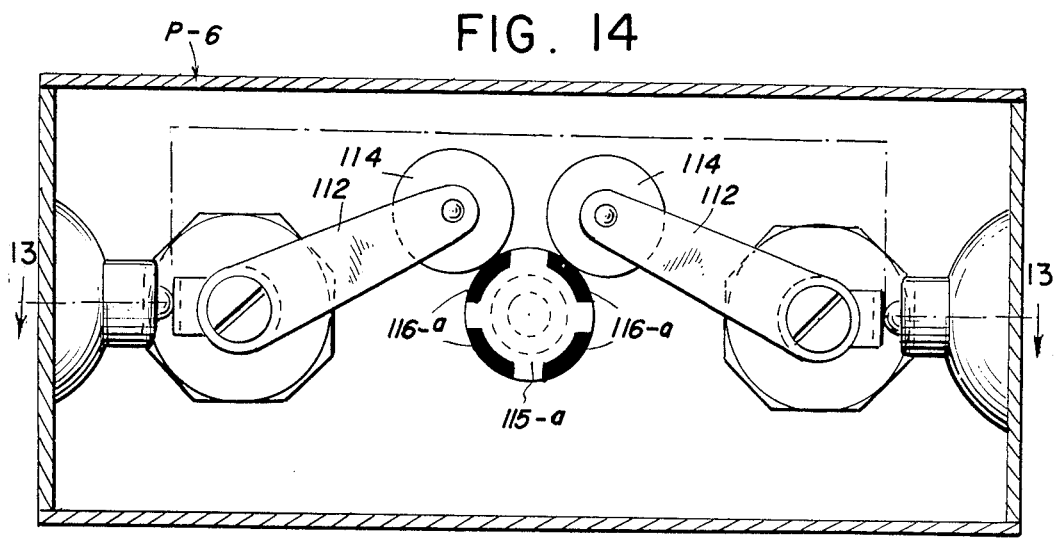
INVENTOR
Paul H. MacMahon
BY Ogle R. Singleton
ATTORNEY

United States Patent Office 2,732,541
Patented Jan. 24, 1956

2,732,541

SIGNALLING DEVICES

Paul H. MacMahon, Alexandria, Va.

Application September 10, 1952, Serial No. 308,767

13 Claims. (Cl. 340—134)

My invention consists in a new and useful improvement in signalling devices and is designed to provide means for displaying a white and a red light fore and aft, respectively, on a bicycle during its travel. The particularly novel and useful feature of my improved device is the combination of a pair of electric lamps, for displaying a white and a red light respectively, which are mounted on one of the pedals of the bicycle, with a source of electricity carried by the pedal, and novel means for closing and opening the circuits for the lamps which are automatically operated by the rotation of the pedal-carrying shaft relative to the pedal when the bicycle is being driven by its pedals. By this means I can produce flashing lights similar to those used at railroad crossings.

A very valuable feature of my device is the fact that the device is rendered inoperative by placing the operating pedal in one position, and rendered operative by merely reversing the pedal. The value of this feature lies in the fact that when the bicycle is not in use or in use in daylight when lights are not desired, the device is rendered inoperative, thereby avoiding unnecessary use of current.

I have illustrated in the drawings and hereinafter fully describe the structure and operation of three embodiments of my invention.

In one of these embodiments, I utilize a cam moved through a circular path by rotation of the pedal-carrying shaft, and pivoted rollers which are moved by the cam to open and close the circuits of the lamps.

In another embodiment, I utilize a switching shaft rotated by the pedal-carrying shaft, a single dry cell battery provided with an electrical contact roller engaging a contact track on the switching shaft, and two contact rollers for the two lamps respectively which alternately engage the contact track on the switching roller, so that the lamps are alternately lit by rotation of the shafts.

In the third embodiment, I utilize the switching shaft, two dry cell batteries, each with its contact roller engaging the track on the switching shaft, and two contact rollers for the two lamps, respectively, each of which intermittently engages the contact track, so that both lamps are flashed.

While I have thus disclosed such embodiments of my invention, it is to be distinctly understood that I do not consider my invention to be limited to said embodiments, but refer for its scope to the claims appended hereto.

In the drawings:

Fig. 10 is a horizontal section, on the line 10—10 of Fig. 11, in the direction of the arrows, of a second embodiment of my invention.

Fig. 11 is a vertical section on the line 11—11 of Fig. 10, in the direction of the arrows.

Fig. 12 is a vertical section on the line 12—12 of Fig. 10.

Fig. 13 is a horizontal section, on the line 13—13 of Fig. 14, in the direction of the arrows, of a third embodiment of my invention.

Fig. 14 is a vertical section on the line 14—14 of Fig. 13, in the direction of the arrows.

Figure 1:
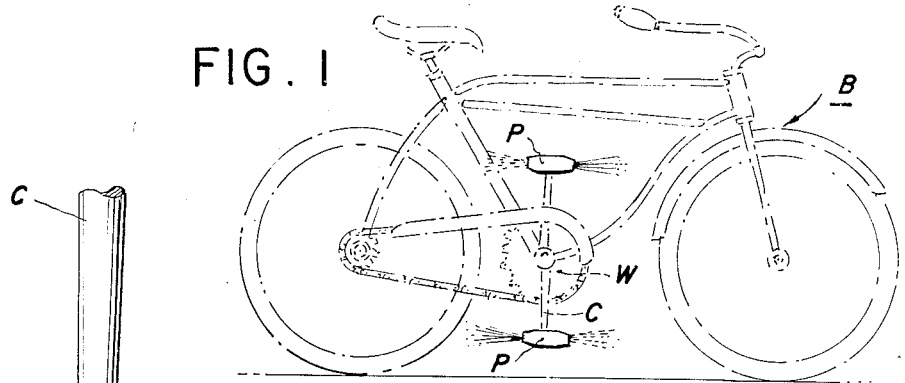
Fig. 1 is a perspective of a bicycle equipped with my improved signalling device.

As shown in the drawings, my improved device is provided for a bicycle B (Fig. 1) having the ordinary cranks C on the sprocket wheel W, each crank having removably mounted on its end a pedal supporting shaft S. My device illustrated in Figs. 2 to 9 comprises a pedal P (Fig. 2) journaled on the shaft S of the crank C on the left-hand side of the wheel W. The pedal P has the usual sleeve P–1 rotatable on the shaft S, the end plate P–2 on the inner end of the pedal P and a casing P–3 on the outer end, the plate P–2 and casing P–3 being mounted on sleeve P–1. A pair of suitable tubular members P–4 disposed on the sides of the sleeve P–1 respectively, are mounted in the plate P–2 and casing P–3 and carry the rubber treads, P–5.

The casing P–3 has an inner wall 1 mounted on the sleeve P–1 and in which are mounted the outer ends of the tubular members P–4, a top wall 2 and a bottom wall 3, fixed to the inner wall 1. The casing P–3 has removable end walls 4 and 5 (Fig. 4) constituting blocks which are fitted to walls 2 and 3. The outer wall 6 of the casing P–3 is removably mounted by bolts 7 passed through the end walls 4 and 5, tapped into the inner wall 1 and having countersunk heads in the outer wall 6.

Figure 4:
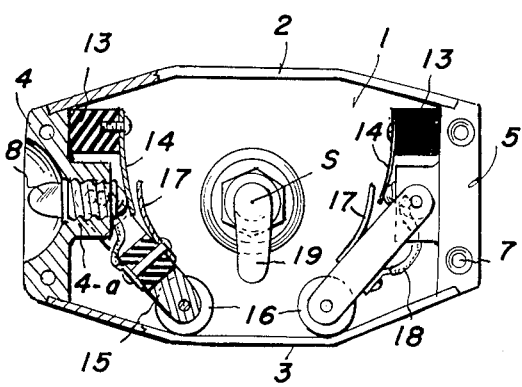
Fig. 4 is a side elevation of the casing, the cover being removed to show the housed parts in their positions when the pedal is in the position shown in Fig. 3.
Figure 7:
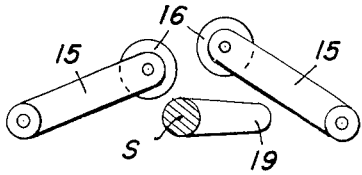
Fig. 7 is a fragmentary view showing the parts in position to light only the front lamp.
Figure 5:
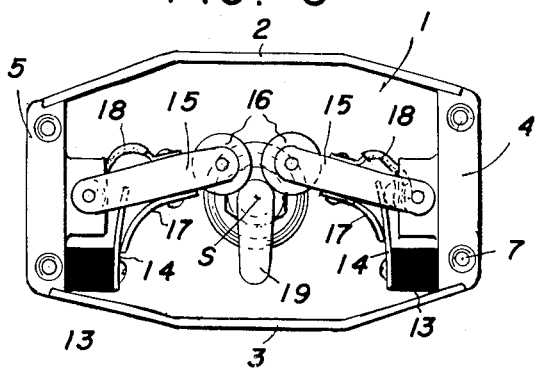
Fig. 5 is a view similar to Fig. 4, the parts being shown in positions to light both lamps, the pedal being reversed from the position shown in Figs. 3 and 4.

The end wall 4 has a socket 4–a in which is carried a red electric bulb 8 (Fig. 4). The end wall 5 has a similar socket in which is carried a white electric bulb.

It is to be understood that one of the contacts of each bulb is grounded through the socket in which the bulb is mounted.

Figure 2:
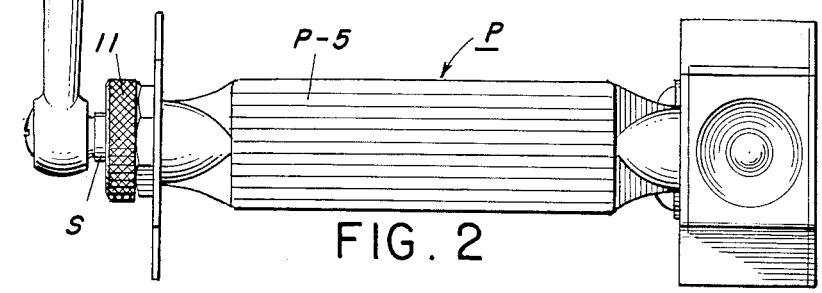
Fig. 2 is a front elevation of the pedal carrying the device.
Figure 3:
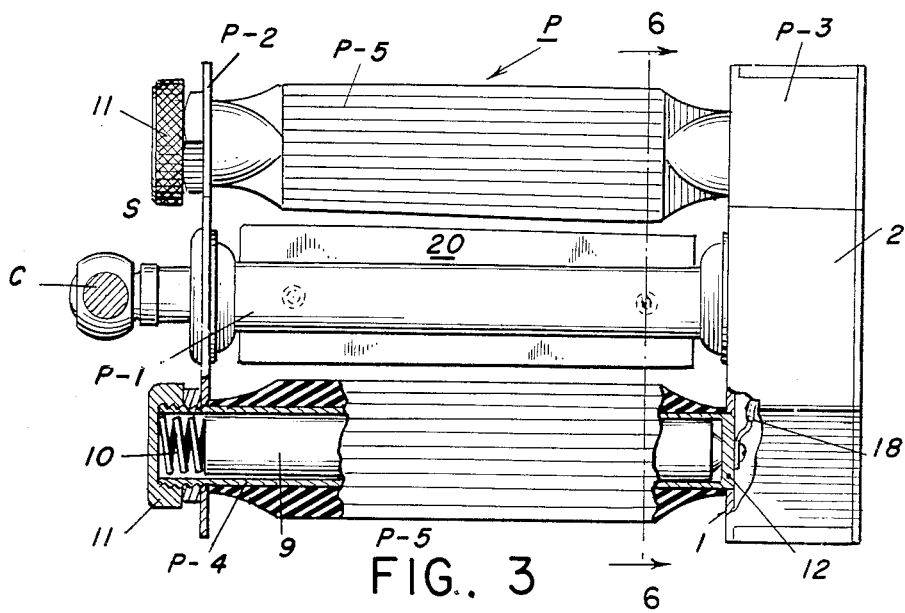
Fig. 3 is a top plan, parts being broken away, the pedal being in position relative to its supporting shaft to render the device inoperative.

Suitable electric batteries 9 are carried in the tubular members P–4 (Fig.2). The batteries 9 are inserted into members P–4 through their open ends mounted in plate P–2, and are held therein by springs 10 and cover plates 11 threaded on the ends of members P–4.

It is to be understood that batteries 9 are grounded by springs 10 and plates 11.

When batteries 9 are thus positioned they effect electrical contact with conductors 12 carried by the innei plate 1 of the casing P–3.

Since the mechanism for controlling the flow of electricity from the batteries to each of the two bulbs is identical, description of one unit will suffice.

Wall 4 has mounted on its inner face an insulation block 13 carrying a contact plate 14 bearing on the ungrounded lead of the bulb 8. The wall 4 has a bracket 15 pivoted thereon and carrying a roller 16. Suitably mounted on bracket 15 is a contact plate 17 co-acting with plate 14. A suitable flexible conductor cable 18 connects plate 17 with the conductor 12 of the battery 9. It is to be understood that conductor 12, cable 18 and plate 17 are properly insulated.

It is obvious that the foregoing parts form an electrical circuit for the battery and the bulb, the circuits being opened and closed by swinging of bracket 15 to move plate 17 into and out of contact with plate 14.

The outer end of the shaft S extends into the casing P–3 and has thereon a cam 19 extending normal to the axis of shaft S. This cam 19 is so disposed as to co-act with rollers 16 to rock brackets 15, when the pedal P is positioned for functioning of my device.

Figure 6:
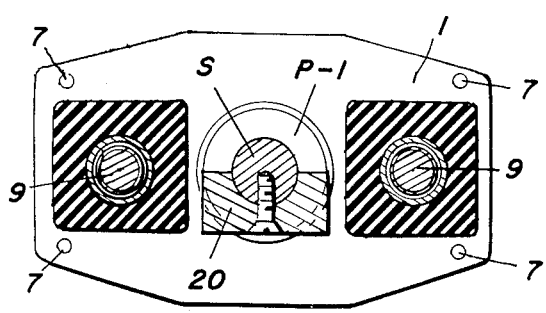
Fig. 6 is a vertical section on the line 6—6 of Fig. 2 in the direction of the arrows.

In order to position the pedal P so that normally the device shall be inoperative, a weight 20 is mounted eccentrically of sleeve P–1 (Figs. 2 and 6).

I will now describe the operation of my improved device illustrated in Figs. 2 to 9. It is obvious (Fig. 1) that when the bicycle B is being driven the cranks C are rotated clockwise as viewed in Fig. 1, by pressure on the pedals exerted by the rider, thereby causing the shaft S to rotate relative to the pedal P, causing the cam 19 to travel counterclockwise, as viewed in Figs. 4 and 5.

It is apparent (Fig. 4) that, when the pedal P is in normal position by action of weight 20, the rollers 16 depressed by gravity rest upon the bottom wall 3 of the casing P–3 and are consequently removed from the path of travel of the cam 19, and that when the rollers 16 are so disposed the brackets 15 are swung downwardly to move the contacts 17, thereby interrupting the circuits of the batteries 9 and both lamps, so that so long as the pedal P is so positioned both lamps will be unlit.

In order to render the device operative, the rider reverses the pedal P (Fig. 5) thereby disposing the rollers 16 above the shaft S so that the rollers 16 are within the path of travel of the cam 19.

It will be noted (Fig. 5) that when the pedal P is so positioned, for operation of my device, the white lamp in wall 5 is directed forwardly, and the red lamp in wall 4 is directed rearwardly.

It will be noted (Fig. 5) that when the cam 19 projects downwardly from shaft S, both rollers 16 are lowered to swing the brackets 15 downwardly so that both contacts 17 engage contacts 14 closing both circuits and lighting both lamps. This condition continues until shaft S has moved the cam 19 counterclockwise through 90° (Fig. 7) to raise roller 16 and bracket 15 on wall 4, to break the circuit to the red lamp 8 putting out that lamp. The white lamp in wall 5 remains lit, since the movement of cam 19 has not affected the circuit of that lamp. This condition continues until shaft S has moved the cam 19 counterclockwise through a second 90° (Fig. 8) to hold roller 16 and bracket 15 on wall 4 sufficiently high to hold open the circuit to the red lamp 8 and raise roller 16 and bracket 15 on wall 5 to break the circuit to the white lamp, so that both lamps are unlit.

As the shaft S moves the cam 19 through the third 90° (Fig. 9) the roller 16 and bracket 15 on wall 4 are lowered sufficiently to close the circuit to the red lamp 8 keeping it lit, and holding the roller 16 and bracket 15 on wall 5 sufficiently high to keep the circuit to the white lamp open so that it remains unlit.

As the shaft S moves the cam 19 through the fourth 90° (Fig. 5) both circuits are closed lighting both lamps.

Figure 8:
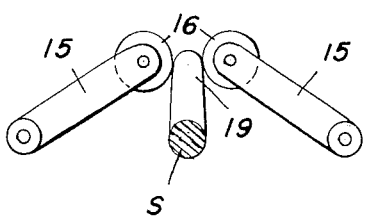
Fig. 8 is a similar view, the parts being in positions in which both lamps are unlit.
Figure 9:
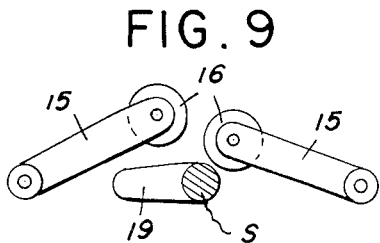
Fig. 9 is a similar view, the parts being in positions to light only the rear lamp.

From the foregoing description of the operation of the device, it will be noted that the red lamp 8 is lit as the cam 19 moves from its uppermost position (Fig. 8) through an arc of 270°, to its position to the extreme right of shaft S (Fig. 7) and that the red lamp 8 is not lit as the cam 19 moves through the remaining 90°. The white lamp is not lit as the cam 19 moves from its uppermost position (Fig. 8) through an arc of 90° to its position to the extreme left of shaft S (Fig. 9) and that the white lamp is lit as the cam 19 moves from said left position (Fig. 9) through an arc of 270° to its uppermost position (Fig. 8).

In the embodiment of my invention illustrated in Figs. 10, 11 and 12, the pedal P is provided on its outer end with a casing P–6 having an inner wall 101 mounted on the outer ends of the members P–4 which may be solid rods carrying the rubber treads P–5, a top wall 102, a bottom wall 103, end walls 104 and 105, and an outer wall 106, removably attached to walls 102–105 in any suitable manner. The end wall 104 has a socket 104–a in which is carried a red electric bulb 107 and the end wall 105 has a socket 105–a in which is carried a white electric bulb 108. It is to be understood that one of the contacts of each of the bulbs 107 and 108 is grounded through the socket in which the bulb is mounted. A suitable electric battery 109 is positioned in casing P–6, resting on the bottom wall 103, one of its contacts being grounded on wall 104. A biased contact arm 110 engages the other contact of battery 109 and is carried on a shaft 111 mounted in walls 101 and 106. A bracket 112 has a collar 113 loose about shaft 111 and carries a contact roller 114. It is to be understood that arm 110, bracket 112, collar 113 and roller 114 are in electrical contact and insulated from shaft 111.

A switching shaft 115 is suitably co-axially mounted on the outer end of shaft S and disposed centrally of casing P–6. The shaft 115 is composed of suitable material to serve as an electrical conductor and it is insulated from shaft S. The shaft 115 has a plurality of insulation inserts 116 symmetrically disposed on its periphery, extending longitudinally for approximately one half of the length of the shaft 115 (Fig. 10).

A shaft 117 is mounted on the walls 101 and 106 and carries a contact arm 118 engaging the other contact of the bulb 107. A contact arm 119 is carried by shaft 111 and engages the other contact of the bulb 108. Brackets 120 and 121 have collars 122 and 123 about shafts 111 and 117, and carry rollers 124 and 125. It is to be understood that the arm 118, bracket 121, collar 123 and roller 125 are in electric contact and insulated from shaft 117, and that arm 119, bracket 120, collar 122 and roller 124 are in electric contact and insulated from shaft 111.

It will be noted (Fig. 10) that when the pedal P is positioned to dispose the casing P–6 as shown in Figs. 10 and 11, the roller 114 constantly engages the contact track of switching shaft 115 during its rotation and that rollers 124 and 125 engage the shaft 115 at its portion wherein are disposed the insulation inserts 116 so that they intermittently engage the contact track of switching shaft 115 during its rotation.

It will also be noted (Fig. 12) that the inserts 116 are so disposed as to cause the rollers 124 and 125 to engage the contact track alternately, so that the circuit from battery 109 to only one of the lamps 107 and 108 is closed at any time.

It is to be understood that the pedal P of this embodiment has the weight 20 to hold the pedal P normally in position reverse from that shown in Figs. 10 and 11, causing the rollers 124 and 125 to swing by gravity to rest on wall 102 and out of contact with the switching shaft 115 to render the device inoperative.

From the foregoing description of the structure of this embodiment its operation is obvious. When it is desired to use lamps 107 and 108, the pedal P is reversed (position in Figs. 10 and 11) current from battery 109 flows to switching shaft 115 and from there to lamps 107 and 108, the contact track on shaft 115 causing the lamps 107 and 108 to flash alternately.

In the embodiment of my invention illustrated in Figs. 13 and 14, the pedal P has two batteries 9 mounted and electrically connected (as above described). In this case the conductors 12 are electrically connected to shafts 111 and 117 in which are insulated casing P–6. This embodiment has a pair of brackets 112, collars 113 and rollers 114, carried by shafts 111 and 117, respectively, in electric contact with said shafts. Lamps 107 and 108 have contact arms 118, 119, brackets 120, 121, collars 122, 123 and rollers 124 and 125 insulated from shafts 111 and 117.

In this embodiment, the switching shaft 115-a has insulated inserts 116-a which extend longitudinally through the whole length of shaft 115-a (Fig. 13). This arrangement causes all of the rollers 114, 124 and 125 to intermittently engage the contact track when shaft 115-a is rotated and cause lamps 107 and 108 to flash synchronously.

It is obvious that the timing of the flashes can be varied by varying the positions and dimensions of the inserts 116-a.

This embodiment having the weight 20 can be rendered inoperative by reversing the pedal P.

Having described my invention, what I claim is:

1. In a signalling device for a bicycle having a pedal journaled on a pedal-carrying shaft, the combination of an electric lamp on the pedal; an electric battery on the pedal; an electric circuit connecting said lamp and said battery; and means operated by rotation of the shaft relative to the pedal, adapted to open and close said circuit, said means being operative and inoperative when the pedal is disposed in two positions relative to the shaft, respectively.

2. In a signalling device for a bicycle having a pedal journaled on a pedal-carrying shaft, the combination of two electric lamps on the pedal; two electric batteries on the pedal; two electric circuits connecting said lamps and said batteries, respectively; and means operated by rotation of the shaft relative to the pedal, adapted to control said circuits, independently, to cause said lamps to flash, and to determine the timing of the flashes, said means being operative and inoperative when the pedal is disposed in two positions relative to the shaft, respectively.

3. In a signalling device for a bicycle having a pedal journaled on a pedal-carrying shaft, the combination of two electric lamps on the pedal; an electric battery on the pedal; two electric circuits connecting said lamps with said battery; and means operated by rotation of the shaft relative to the pedal, adapted to control said circuits, independently, to cause said lamps to flash alternately, said means being operative and inoperative when the pedal is disposed in two positions relative to the shaft, respectively.

4. In a signalling device for a bicycle having a pedal journaled on a pedal-carrying shaft, the combination of a casing on the pedal; two electric lamps mounted in the casing; two electric batteries on the pedal; two brackets pivoted in the casing; two rollers on said brackets, respectively, a cam in said casing, carried by the shaft and adapted to co-act with said rollers to rock said brackets; two electric circuits connecting said lamps and said batteries, respectively; two contact members in each circuit, one of which is carried by a bracket, each bracket moving its contact members into and out of contact to close and open one circuit when said brackets are rocked.

5. In a signalling device for a bicycle having a pedal journaled on a pedal-carrying shaft, the combination of a casing on the pedal; two electric lamps mounted in the casing; two electric batteries on the pedal; two brackets pivoted in the casing; two rollers on said brackets, respectively; a cam in said casing, carried by the shaft and adapted to co-act with said rollers to rock said brackets; two electric circuits connecting said lamps and said batteries, respectively; two contact members in each circuit, one of which is carried by a bracket, each bracket moving its contact members into and out of contact to close and open one circuit when said brackets are rocked, a weight on said pedal adapted to so normally position said pedal that said cam and said rollers do not co-act, to render the device inoperative.

6. In a signalling device for a bicycle having a pedal journaled on a pedal-carrying shaft, the combination of a casing on the pedal; two electric lamps mounted in the casing; two electric batteries on the pedal; a pair of rollers pivoted in said casing and electrically connected to said lamps, respectively; a second pair of rollers pivoted in said casing and electrically connected to said batteries, respectively; a switching-shaft in said casing, carried by said pedal-carrying shaft, rotated thereby and adapted to co-act with said rollers to effect intermittent electric connection between the rollers of the first and second pairs.

7. In a signalling device for a bicycle having a pedal journaled on a pedal-carrying shaft, the combination of a casing on the pedal; two electric lamps mounted in the casing; two electric batteries on the pedal; a pair of rollers pivoted in said casing and electrically connected to said lamps, respectively; a second pair of rollers pivoted in said casing and electrically connected to said batteries, respectively; a switching-shaft in said casing, carried by said pedal-carrying shaft, rotated thereby and adapted to co-act with said rollers to effect intermittent electric connection between the rollers of the first and second pairs, a weight on said pedal adapted to so normally position said pedal that said switching shaft and said rollers do not co-act, to render the device inoperative.

8. In a signalling device for a bicycle having a pedal journaled on a pedal-carrying shaft; the combination of a casing on the pedal; two electric lamps mounted in the casing; an electric battery in the casing; a pair of rollers pivoted in said casing and electrically connected to said lamps, respectively; a third roller pivoted in said casing and electrically connected to said battery; a switching shaft in said casing, carried by said pedal-carrying shaft, rotated thereby and adapted to co-act with said rollers to effect alternate electric connection between said third roller and the rollers of the pair.

9. In a signalling device for a bicycle having a pedal journaled on a pedal-carrying shaft; the combination of a casing on the pedal; two electric lamps mounted in the casing; an electric battery in the casing; a pair of rollers pivoted in said casing and electrically connected to said lamps, respectively; a third roller pivoted in said casing and electrically connected to said battery; a switching shaft in said casing, carried by said pedal-carrying shaft, rotated thereby and adapted to co-act with said rollers to effect alternate electric connection between said third roller and the rollers of the pair, a weight on said pedal adapted to so normally position said pedal that said switching shaft and said rollers do not co-act, to render the device inoperative.

10. In a signalling device, the combination of a casing adapted to be moved in a circular orbit; a shaft adapted to be moved in said orbit and on which said casing is journaled, said shaft being rotated in said casing by said movement; a cam on said shaft; an electric lamp in said casing; an electric battery in said casing; an electric circuit connecting said lamp and said battery; and an electric switch arm pivoted in said casing and adapted to open and close said circuit, said arm being operated by said cam by rotation of said shaft.

11. In a signalling device, the combination of a casing; a shaft rotatable in said casing; an electric lamp in said casing; an electric battery in said casing; an electric circuit connecting said lamp and said battery; an electric switch arm pivoted in said casing and adapted to open and close said circuit; and a cam on said shaft for operating said switch arm by rotation of said shaft, said cam being operative and inoperative when the casing is positioned to dispose said switch arm above and below said shaft, respectively.

12. In a signalling device for a bicycle having a pedal journaled on a pedal-carrying shaft, the combination of an electric lamp on the pedal; an electric battery on the pedal; an electric circuit connecting said lamp and said battery; an electric switch arm pivoted in said pedal and adapted to open and close said circuit; and a cam on said shaft for operating said switch arm, on rotation of the shaft relative to the pedal.

13. In a signalling device for a bicycle having a pedal journaled on a pedal-carrying shaft, said shaft rotating relative to the pedal when the bicycle is propelled by the pedal, the combination of an electric lamp on the pedal; an electric battery on the pedal; an electric circuit connecting said lamp and said battery; an electric switch arm, in said circuit, pivoted on the pedal, and adapted to be moved by gravity into and out of contact with said shaft, when the pedal is in two positions relative to the shaft, respectively; and a cam so projecting radially from said shaft as to move said arm to close and open said circuit, when said arm has been moved into contact with said shaft, and said shaft is rotated relative to said pedal.

References Cited in the file of this patent

UNITED STATES PATENTS

| | | |
|---|---|---|
| 1,928,873 | Acton | Oct. 3, 1933 |
| 2,185,600 | McComb | Jan. 2, 1940 |
| 2,273,747 | Adler | Feb. 17, 1942 |
| 2,300,795 | McAllister | Nov. 3, 1942 |
| 2,301,250 | Callan | Nov. 10, 1942 |
| 2,334,442 | Salimbene | Nov. 16, 1943 |
| 2,401,940 | Lange | June 11, 1946 |
| 2,661,406 | Callan | Dec. 1, 1953 |